United States Patent

Li

[11] Patent Number: 6,148,534
[45] Date of Patent: Nov. 21, 2000

[54] TAPE RULE WITH AN ELABORATE BUFFER

[76] Inventor: Shih Lin Li, No. 22, Lane 81, Sec. 2 Tunha S. Rd., Taipei, Taiwan

[21] Appl. No.: 09/238,146

[22] Filed: Jan. 28, 1999

Related U.S. Application Data

[63] Continuation-in-part of application No. 08/987,854, Dec. 11, 1997, abandoned.

[51] Int. Cl.[7] ...................................................... G01B 3/10
[52] U.S. Cl. .................................. 33/769; 33/755; 33/761
[58] Field of Search .............................. 33/755, 761, 767, 33/768, 769, 770; 242/385, 385.2, 385.3

[56] References Cited

U.S. PATENT DOCUMENTS

| | | | |
|---|---|---|---|
| 3,905,114 | 9/1975 | Rutty | 33/767 |
| 4,479,617 | 10/1984 | Edwards | 33/761 |
| 4,748,746 | 6/1988 | Jacoff | 33/761 |
| 5,210,956 | 5/1993 | Knispel et al. | 33/761 |
| 5,395,069 | 3/1995 | Chen | 33/767 |
| 5,699,623 | 12/1997 | Lee | 33/758 |
| 5,791,581 | 8/1998 | Loeffler et al. | 33/767 |

FOREIGN PATENT DOCUMENTS

| | | | |
|---|---|---|---|
| 393892 | 10/1990 | European Pat. Off. | 33/767 |
| 1277486 | 6/1972 | United Kingdom | 33/767 |

*Primary Examiner*—Andrew H. Hirshfeld

[57] ABSTRACT

Disclosed herein is a tape rule with an elaborate buffer comprising a tape, a tape rule housing, and a buffer, wherein the buffer together with its buffer block and strut is formed as a whole piece and installed in the housing, and combined with the housing to form a gate in the opening making the tape able to pass therethrough either extending out of or retracting into the housing. During the retraction of the tape, a hook provided at the tip of the tape is detained by the buffer and backlashing forces are transmitted to the buffer. In this manner impact force is absorbed by the buffer to avert damaging the tape hook or even tearing the tape thereby protecting the accuracy of measurement and ensuring durability of the tape rule. Further to this, by virtue of buffer's whole piece structure, the manufacturing process and assembly procedure of the tape rule can be simplified thereby improving its productivity and minimizing production cost.

1 Claim, 6 Drawing Sheets

TAPE RULE WITH AN ELABORATE BUFFER

This application is a continuation-in-part of my application Ser. No. 08/987,854 filed Dec. 11, 1997 now abandoned.

BACKGROUND OF THE INVENTION

1. Field of the Invention

The present invention relates to a tape rule with an elaborate buffer, and more particularly, to a tape rule buffer which alleviates and absorbs backlashing force of the tape during its retraction thereby protecting the tape hook from being damaged or deformed, and ensuring accuracy and durability of the tape rule.

2. Description of the Prior Art

As it is known, most of conventional tape rules are not provided with any buffering device. Therefore, a tape hook equipped on the tip of the tape is prone to be damaged or deformed, or even the tape is torn near the tape hook by a sudden uncontrolled backlashing force caused by the retraction of the tape rendering the tape rule useless. Such phenomenon degrades a conventional tape rule's accuracy of measurement, or even shortens the lifetime of the tape rule which insures the user's unwilling early replacement of his old tape rule with a new one.

To solve this shortcoming, several trials were made for improvement. For example, U.S. Pat. No. 5,395,069 and No. 4,748,746, both show a longitudinally laid arc-shaped counteract region provided either at the outlet or at the rear part of the tape.

In another case patented by U.S. Pat. No. 5,791,581, there is a buffering member provided at the passage of the tape retraction route of a tape rule in which comprises a flat plate at its front end for catching the impact of the retracting tape and transmitting it to a compressed spring provided at the rear end of the buffering member and secured to the flat plate with a prong such that the retracting force of the tape may be absorbed by the spring thereby preventing possible damage to the tape rule. However, the structure is complex and the buffering member is separately assembled which results in increasing production cost. It is also difficult to ensure the quality of the product in case the assembly work is not properly carried out. Thus, it is impossible to ensure a perfect buffering effect and a minimum fault rate of the tape rule. In addition, both buffering member and compressed spring are made of pressed or flexed thin metal strip liable to depart from their original position or even fall off.

In order to solve the problems mentioned above, research and development efforts have been carried out by the inventor of the present invention and finally succeeded in providing a tape rule with an elaborate buffer which is to be disclosed hereinafter.

SUMMARY OF THE INVENTION

The present invention is a modification of my previous invention U.S. Pat. No. 5,699,623. In the previous invention, there is an elastic metallic strip and a tape hook enclosing the tip of the tape forming a three layered structure at the tip of the tape to protect the tape from being damaged or deformed thereby ensuring the accuracy of the tape rule and lengthening the lifetime of the tape rule as well. The present invention is based on the idea of the preceding invention to provide an improved structure for a tape rule with an elaborate buffer to alleviate the backlash impact of the retracting tape thereby assuring a protecting function.

It should be understood that the objects of the present invention are identical to those of the foregoing U.S. Pat. No. 5,791,581 mentioned above. However, the buffer structure of the present invention is much less complicated and its function is more effective compared to that of the other.

It is an object of the present invention to provide a tape rule with an elaborate buffer which can absorb the backlashing force of the retracting tape so as to prevent damage to the tape hook and ensure the durability of the tape rule.

It is another object of the present invention to provide a tape rule with an elaborate buffer, which by virtue of buffer's whole piece structure, simplifies the manufacturing process and assembly procedure thereby improving its productivity and minimizing production cost.

It is still another object of the present invention to provide a tape rule with an elaborate buffer which is well protected from damage to its measurement accuracy by the sudden backlashing force caused by retraction of the tape.

To achieve these and other above mentioned objects, the present invention provides the advantages and features above stated. The tape rule comprises a tape, a tape rule housing and a buffer, wherein the buffer together with its buffer block and strut is formed in a whole piece and is installed in the housing, and combined with the housing to form a gate in the opening so that the tape can pass therethrough either extending out of or retracting into the housing. During the retraction of the tape, a hook provided at the tip of the tape may be detained by the buffer and transmit the backlashing force to the buffer. In such a manner impact force is absorbed by the buffer to avert damaging the tape hook or even tearing the tape thereby protecting the accuracy of measurement and ensuring durability of the tape rule.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
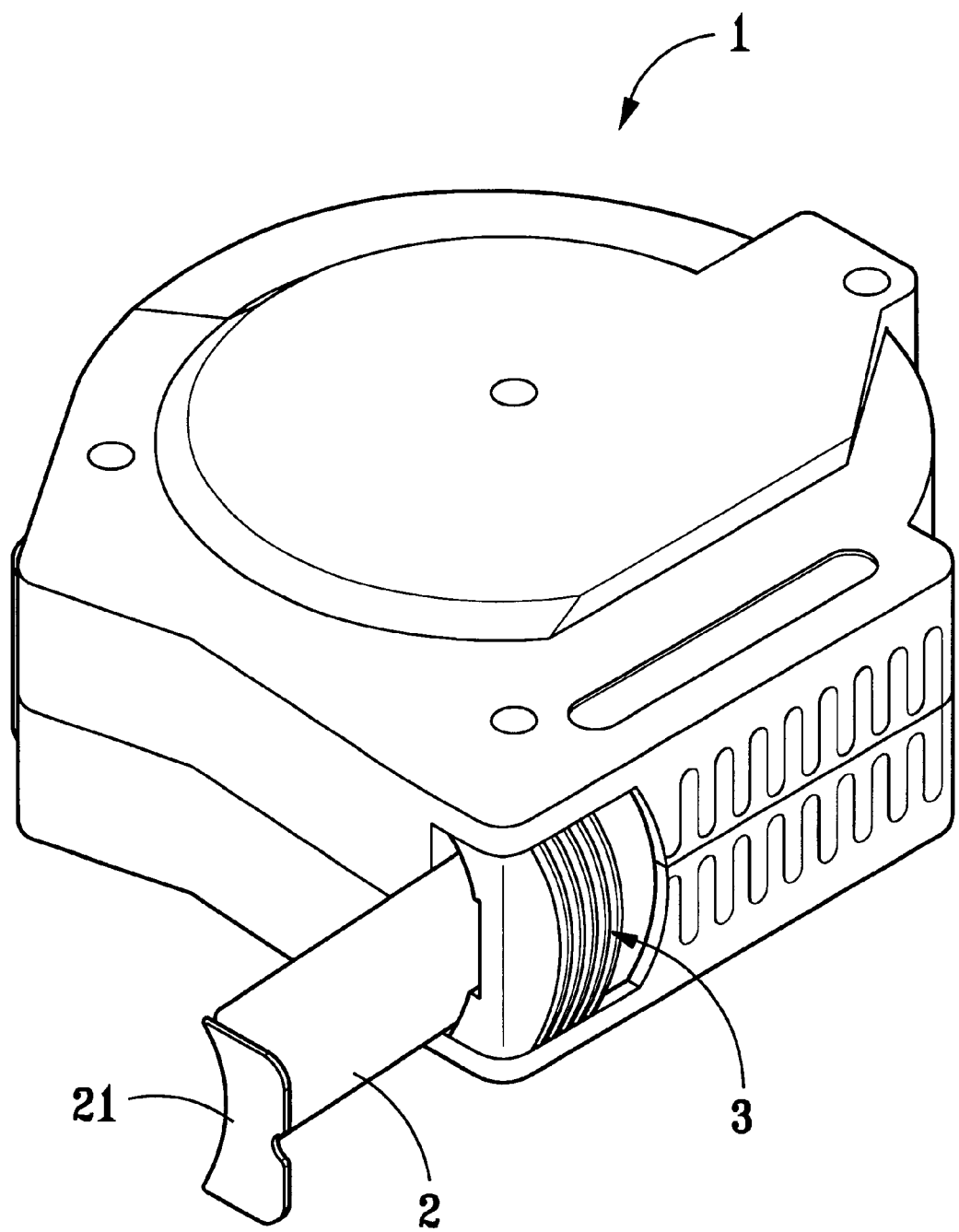
FIG. 1 is a three dimensional assembly drawing of the tape rule with an elaborate buffer according to the present invention.
Figure 2:
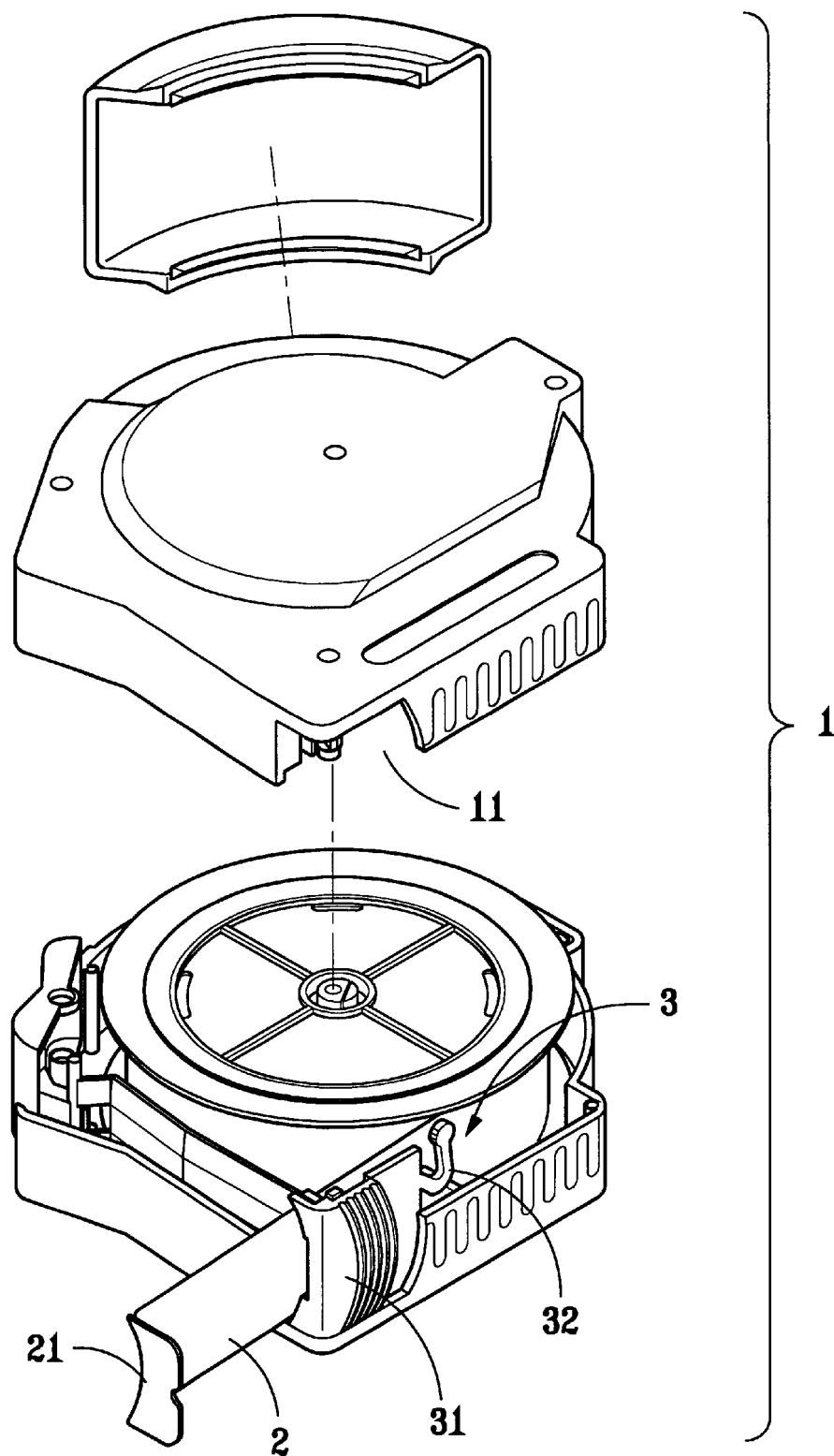
FIG. 2 shows a three dimensional exploded view of the tape rule with an elaborate buffer in a first embodiment according to the present invention with FIG. 2A showing detail parts of the buffer.
Figure 2A:
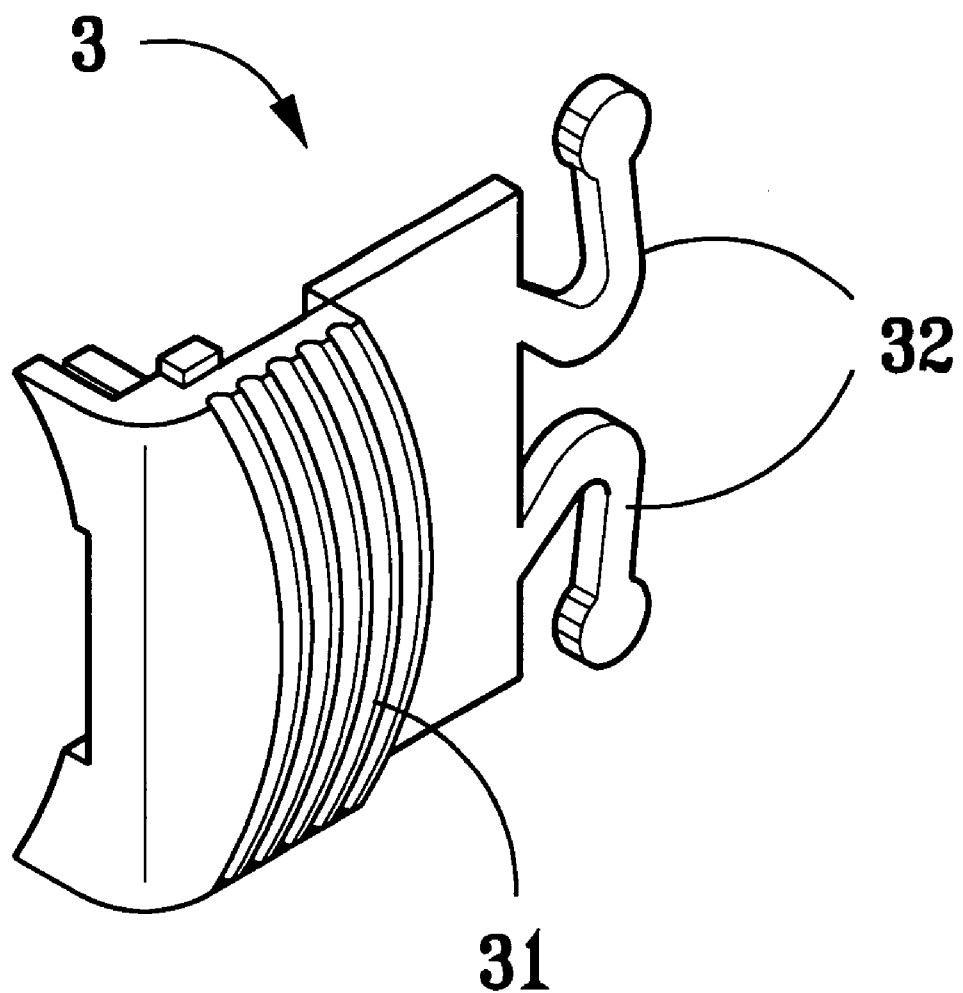

Referring to FIGS. 1 and 2, wherein the tape rule with an elaborate buffer according to the present invention comprises:

a tape 2 having a tape hook 21 attached to its tip for serving as an initial zero point for measurement, it also can be hooked on the beginning end of a measured object for the convenience of measurement;

a tape rule housing 1 for accommodating the tape 2 having an opening 11 at one end which serves as an exit for the tape 2;

a buffer 3 being laid and secured to the tape rule housing 1, the buffer 3 and the housing 1 combined to form a gate at the opening 11 for the tape 2 to pass through either extending out of or retracting into the housing 1, before drawing out the tape 2, the tape hook 21 regularly rests on the buffer 3.

Figure 3:
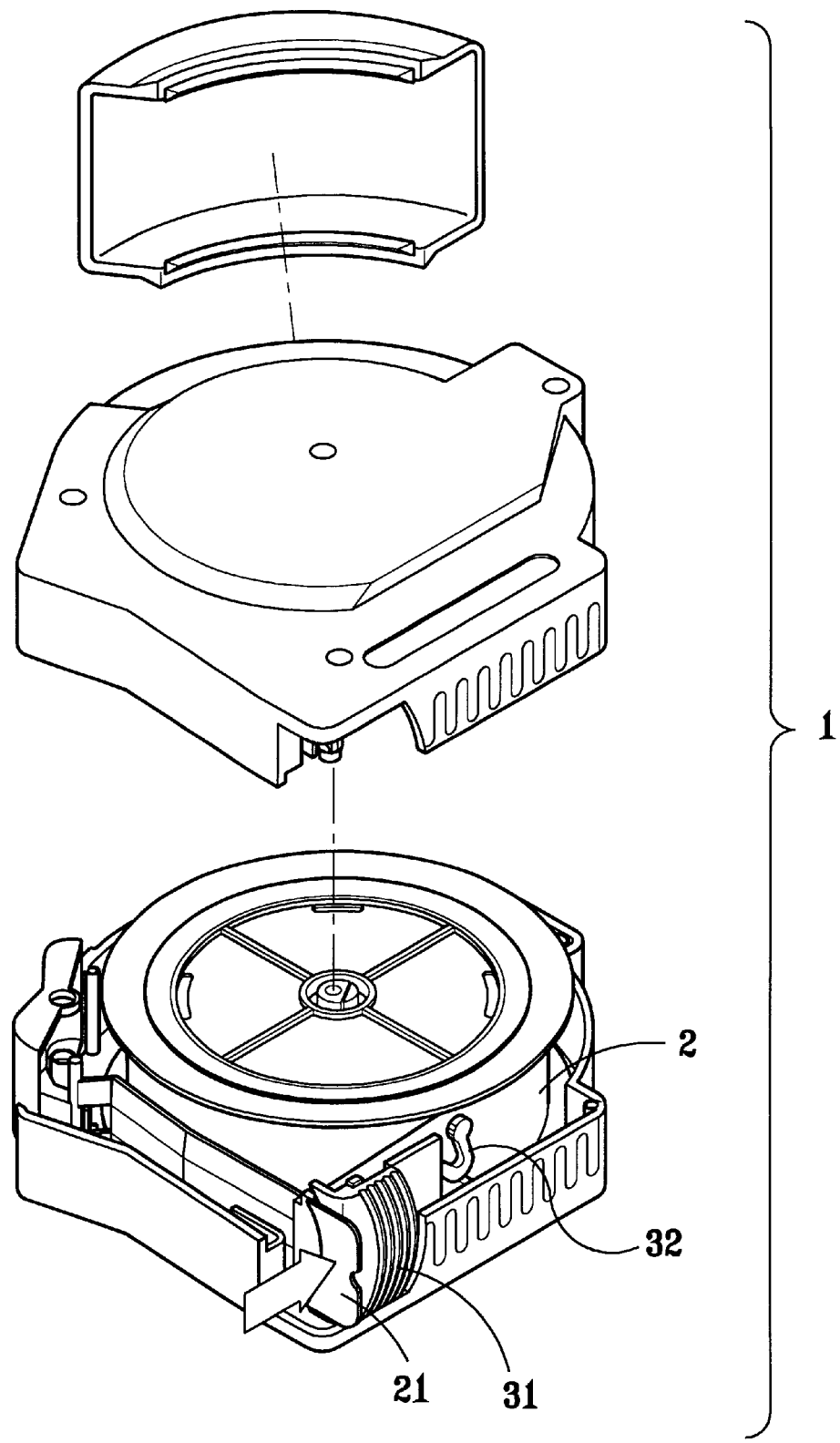
FIG. 3 is a similar drawing to FIG. 2 but showing the state when the buffer withstands a backlashing force exerted by the retracting tape.

FIG. 3 shows the state when the buffer 3 withstands a backlashing force exerted by the retracting tape. A buffer block 31 provided on the head of the buffer 3 is situated at the opening 11 of the housing 1 and in contact with the tape hook 21, while a buffer strut 32 formed as a whole piece with the buffer block 31 and being made of a flat plate of proper thickness flexes its feet outwardly to both sides from its rear portion and secures its two feet to the inner side wall of the housing 1 so as to enable the buffer strut 32 to maintain relevant resiliency. The tape hook 21 provided at the tip of the tape 2 may be detained by the buffer block 31 thereof and the backlashing force exerted thereto is transmitted to the buffer strut 32 and absorbed thereat during retraction of the tape 2.

Figure 4:
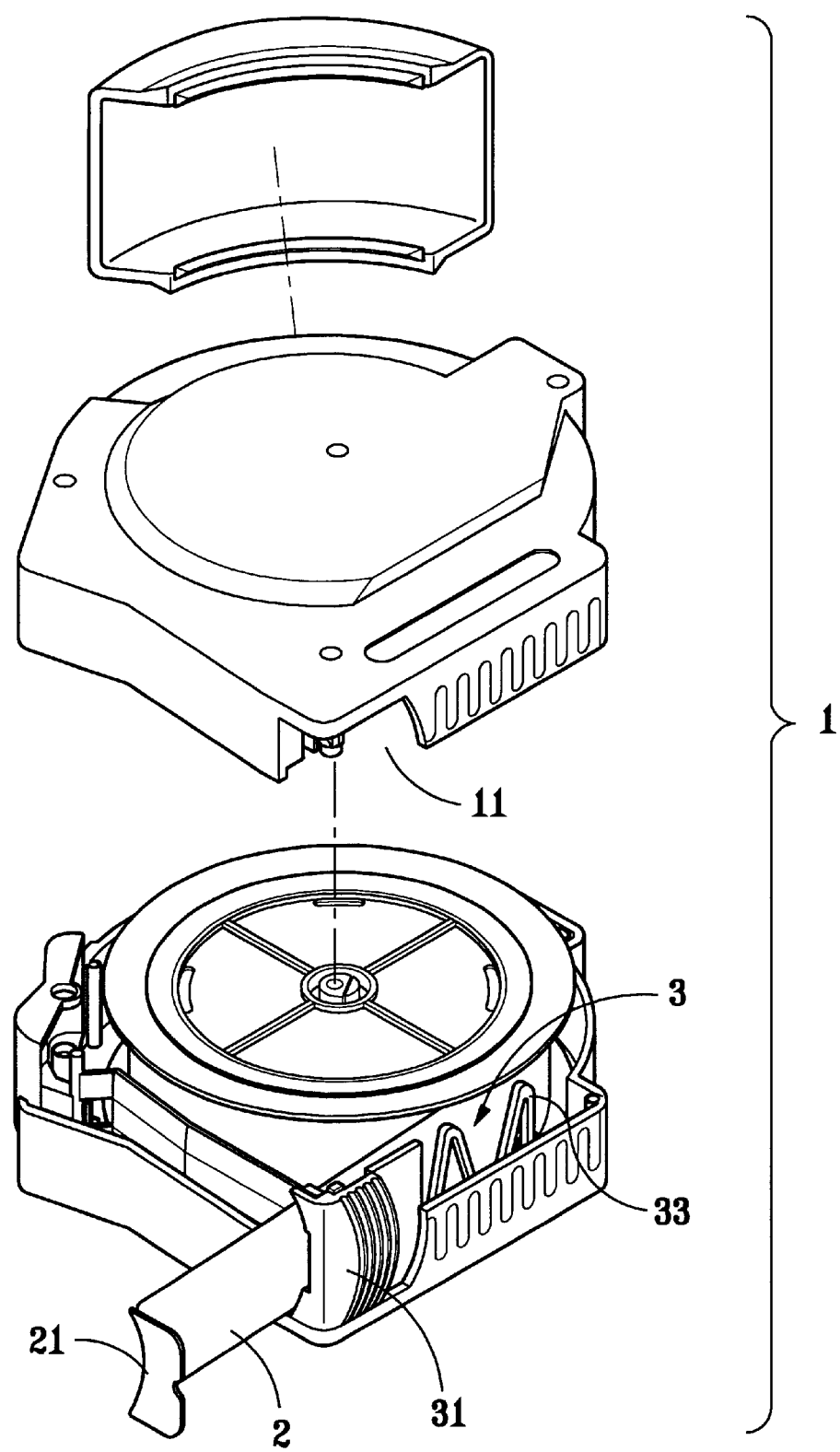
FIG. 4 shows a three dimensional exploded view of the tape rule with an elaborate buffer in a second embodiment according to the present invention.
Figure 5:
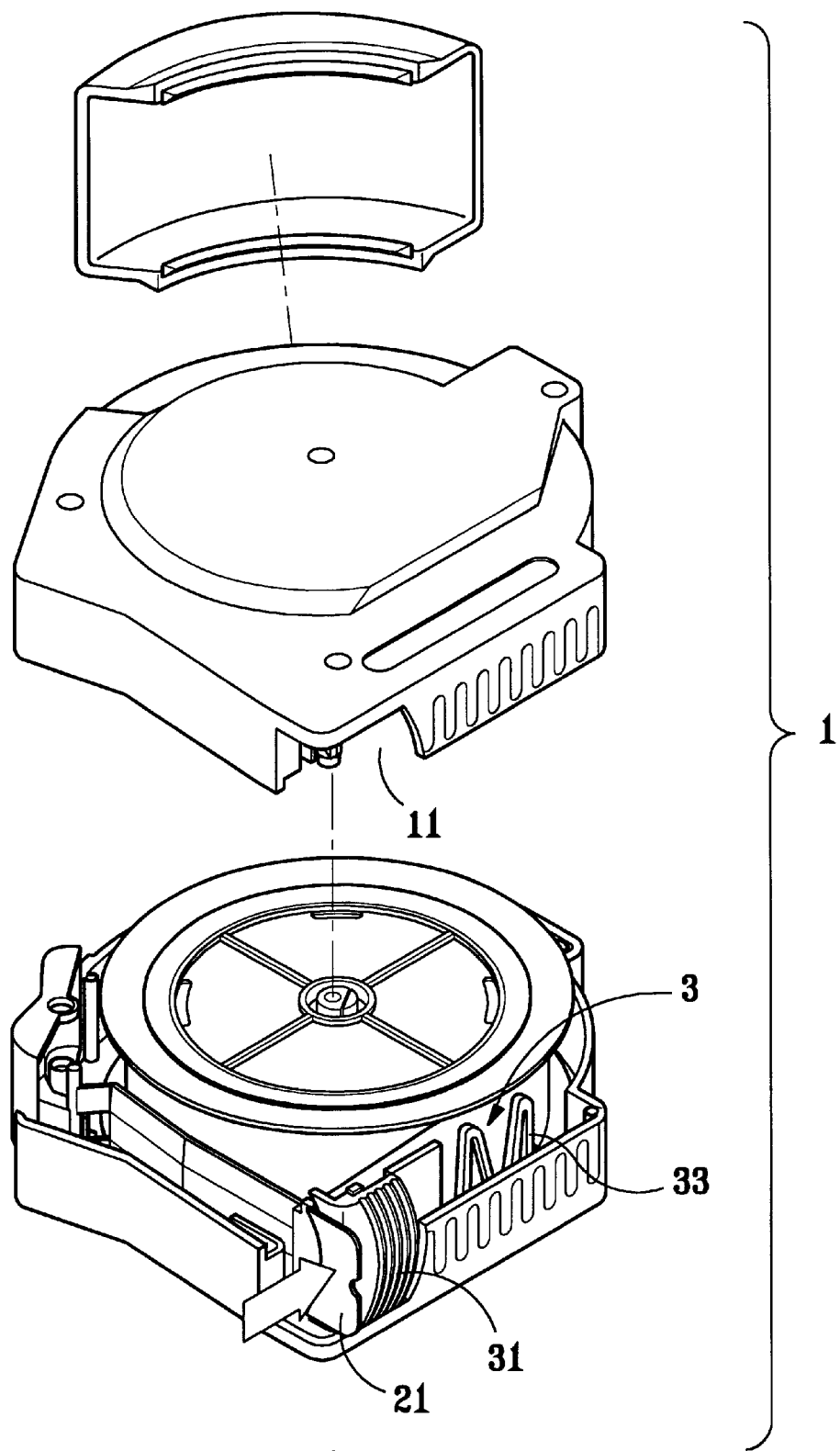
FIG. 5 is a drawing showing the state when the buffer in a second embodiment according to the present invention is withstanding a backlashing force exerted by the retracting tape.

Referring to FIGS. 4 and 5, wherein the tape rule with an elaborate buffer and its operating principle in a second embodiment according to the present invention are illustrated, in this embodiment, a buffer strut 33 is provided for the buffer 3 instead of the buffer strut 32 in the first embodiment. The buffer 3 consists of a buffer block 31 and the buffer strut 33 which are formed as a whole piece. The buffer strut 33 is made of a wave figured plate of proper thickness with its tail secured to the inner side wall surface of the tape rule housing 1. The principle of absorbing the backlashing force exerted by the retracting tape 2 performed by the buffer strut 33 is similar to that of the buffer strut 32.

From the two embodiments of the present invention described above, it is obvious that the elaborate buffer provided by the present invention has a significant effect of absorbing backlashing impact force exerted by the retracting tape that can contribute to avert damaging the tape hook or even tearing the tape thereby protecting the accuracy of measurement and ensuring durability of the tape rule. Further to this, by virtue of buffer's whole piece structure, the manufacturing process and assembly procedure of the tape rule can be simplified thereby improving its productivity and minimizing production cost.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A tape rule with an elaborate buffer comprising:

a coiled longitudinally extendable tape rule having a tip and a tip hook attached to said tip; and a tape rule housing having a pair of side walls and an end wall surrounding said side walls for accommodating said coiled longitudinally extendable tape rule therein, said end wall having an opening therein for serving as a gate for said longitudinally extendable tape rule to extend outwardly from said housing and retracting said tape rule into said housing;

said buffer including a longitudinally extending buffer block having a forward portion and a rear portion, said forward portion being disposed outside said housing adjacent to said opening and said rear portion being disposed within said housing and adjacent to said end wall, and wherein said buffer block includes a rectangular plate in a rear port ion thereof and a pair of laterally extending integrally formed generally J-shaped resilient members having enlarged end portions and extending rearwardly and outwardly in opposite directions from said rectangular plat e with said end portions being secured against the side walls of said housing;

whereby said buffer block buffers the return of said tip hook a s said tape rule is returned to said housing.

* * * * *